US010724486B2

(12) United States Patent
Pobuda et al.

(10) Patent No.: US 10,724,486 B2
(45) Date of Patent: Jul. 28, 2020

(54) FLUID INJECTOR HAVING A DIRECTOR PLATE

(71) Applicant: DELPHI TECHNOLOGIES IP LIMITED, St. Michael (BB)

(72) Inventors: Daniel Pobuda, Fairport, NY (US); Otto Muller-Girard, Jr., Rochester, NY (US)

(73) Assignee: DELPHI TECHNOLOGIES IP LIMITED (BB)

( * ) Notice: Subject to any disclaimer, the term of this patent is extended or adjusted under 35 U.S.C. 154(b) by 203 days.

(21) Appl. No.: 15/927,165

(22) Filed: Mar. 21, 2018

(65) Prior Publication Data

US 2019/0293040 A1 Sep. 26, 2019

(51) Int. Cl.
*F02M 61/16* (2006.01)
*F02M 51/06* (2006.01)
(Continued)

(52) U.S. Cl.
CPC ......... *F02M 61/168* (2013.01); *B05B 7/0425* (2013.01); *F01N 3/2066* (2013.01); *F02M 51/0667* (2013.01); *F02M 61/12* (2013.01); *F02M 61/162* (2013.01); *F02M 61/18* (2013.01); *F02M 61/1853* (2013.01); *F02M 61/1866* (2013.01); *F02M 61/1873* (2013.01); *F01N 2610/02* (2013.01); *F01N 2610/1453* (2013.01); *F02M 61/165* (2013.01); *F02M 61/1806* (2013.01); *F02M 61/188* (2013.01)

(58) Field of Classification Search
CPC .... F02M 61/12; F02M 61/162; F02M 61/165; F02M 61/168; F02M 61/18; F02M 61/1806; F02M 61/1853; F02M 61/1866; F02M 61/1873; F02M 61/188; F02M 51/0667; F01N 3/2066; F01N 2610/02; F01N 2610/1453; B05B 7/0425
USPC ............................................ 239/419.5, 428.5
See application file for complete search history.

(56) References Cited

U.S. PATENT DOCUMENTS 4,566,634 A * 1/1986 Wiegand ................ F02M 57/00 123/585
5,174,505 A * 12/1992 Shen .................. F02M 51/0671 123/531

(Continued)

FOREIGN PATENT DOCUMENTS

JP 2008255912 A 10/2008

*Primary Examiner* — Cody J Lieuwen
(74) *Attorney, Agent, or Firm* — Joshua M. Haines

(57) ABSTRACT

A fluid injector includes a fluid inlet; a valve seat located downstream of the fluid inlet and having a valve seat aperture extending therethrough; a valve member moveable between a closed position and an open position to control flow through the valve seat aperture; and director plate including a first aperture and a second aperture extending therethrough. A fluid flow channel is formed between the valve seat and the director plate and extends from an inlet end to an outlet end. The first aperture and the second aperture extend through the director plate from the fluid flow channel. The first aperture is located between the inlet end and the second aperture. The fluid flow channel decreases in cross-sectional area from the inlet end toward the first aperture and the fluid flow channel increases in cross-sectional area from the first aperture toward the second aperture.

14 Claims, 5 Drawing Sheets

(51) Int. Cl.

| | |
|---|---|
| ***F02M 61/12*** | (2006.01) |
| ***F02M 61/18*** | (2006.01) |
| ***F01N 3/20*** | (2006.01) |
| ***B05B 7/04*** | (2006.01) |

(56) References Cited

U.S. PATENT DOCUMENTS

| | | | | |
|---|---|---|---|---|
| 5,211,682 | A * | 5/1993 | Kadowaki | F02M 51/0671 123/432 |
| 5,215,258 | A * | 6/1993 | Jursich | B05B 1/1636 239/394 |
| 5,360,166 | A * | 11/1994 | Nogi | F02M 61/162 239/404 |
| 6,186,421 | B1 | 2/2001 | Wahba et al. | |
| 2003/0150942 | A1 | 8/2003 | Xu et al. | |
| 2003/0209614 | A1 * | 11/2003 | Liu | B05B 1/262 239/461 |
| 2004/0056115 | A1 | 3/2004 | Peterson, Jr. | |
| 2005/0087630 | A1 | 4/2005 | Sayar | |
| 2005/0127209 | A1 | 6/2005 | Phadke et al. | |
| 2006/0086830 | A1 | 4/2006 | Omura et al. | |
| 2006/0278734 | A1 * | 12/2006 | Morishita | B05B 1/185 239/426 |
| 2009/0057446 | A1 | 3/2009 | Hung et al. | |
| 2012/0305678 | A1 * | 12/2012 | Kaneko | F02M 61/1853 239/585.5 |
| 2012/0325922 | A1 | 12/2012 | Sumida et al. | |
| 2013/0255640 | A1 | 10/2013 | Okamoto et al. | |
| 2014/0252132 | A1 | 9/2014 | Jeannel et al. | |
| 2015/0021416 | A1 | 1/2015 | Raney et al. | |
| 2017/0321586 | A1 | 11/2017 | Stoeberl et al. | |

* cited by examiner

FLUID INJECTOR HAVING A DIRECTOR PLATE

TECHNICAL FIELD OF INVENTION

The present invention relates to a fluid injector for injecting a fluid into an atmosphere, and more particularly to a fluid injector with a director plate which aspirates the atmosphere into the fluid before the fluid is injected into the atmosphere.

BACKGROUND OF INVENTION

Fluid injectors are well known for injecting a fluid into an atmosphere. One well known type of fluid injector is used to inject a reagent such as liquid urea, also known as Diesel Exhaust Fluid (DEF), into an exhaust stream of an internal combustion engine for use in a selective catalytic reduction (SCR) exhaust aftertreatment process. A second well known type of fluid injector is used to inject fuel, such as gasoline or diesel fuel, into an internal combustion engine. In the case of the fluid injector which is used to inject liquid urea, it is important for the liquid urea to be atomized as finely as possible to promote the exhaust aftertreatment process. In the case of the fluid injector which is used to inject fuel, it is important for the fuel to be atomized as finely as possible in order to promote efficient combustion.

Fluid injectors generally include a valve seat with an aperture extending therethrough. A complementary valve member is selectively seated and unseated with the valve seat in order to prevent and permit fluid flow respectively through the aperture. In order to promote atomization, it is known to provide a director plate downstream of the valve seat. The director plate includes one or more director plate apertures extending therethrough which help to atomize the fluid upon discharge therethrough. The director plate may additionally include channels of various shapes which help to introduce turbulence which promotes atomization. One such fluid injector with a director plate is shown in U.S. Pat. No. 6,186,421 to Wahba et al., the disclosure of which is hereby incorporated by reference in its entirety. While known director plates help to atomize the fluid, improvements are continually sought to obtain greater degrees of atomization.

What is needed is a fluid injector which minimizes or eliminates one or more of the shortcomings as set forth above.

SUMMARY OF THE INVENTION

Briefly described, a fluid injector for injecting fluid into an atmosphere includes a fluid inlet which communicates fluid into the fluid injector; a valve seat downstream of the fluid inlet, the valve seat having a valve seat aperture extending therethrough; a valve member which is moveable between 1) a closed position which blocks the valve seat aperture, thereby preventing fluid communication through the valve seat aperture and 2) an open position which unblocks the valve seat aperture, thereby allowing fluid communication through the valve seat aperture; a director plate located downstream of the valve seat, the director plate having a first director plate aperture extending therethrough which aspirates from the atmosphere and a second director plate aperture extending therethrough which discharges fluid from the fluid injector to the atmosphere; and a fluid flow channel formed between the valve seat and the director plate and extending from an inlet end to an outlet end such that the first director plate aperture and the second director plate aperture extend through the director plate from the fluid flow channel and such that the first director plate aperture is located between the inlet end and the second director plate aperture, wherein the inlet end is open to, and proximal to, the valve seat aperture, wherein the fluid flow channel decreases in cross-sectional area in a direction from the inlet end toward the first director plate aperture, and wherein the fluid flow channel increases in cross-sectional area in a direction from the first director plate aperture toward the second director plate aperture.

A method for operating the aforementioned fluid injector is provided where the method includes moving the valve member to the open position; passing fluid through the valve seat aperture to the fluid flow channel in response to moving the valve member to the open position; passing fluid over the first director plate aperture to the second director plate aperture and then to the atmosphere; and aspirating the atmosphere into the fluid flow channel through the first director plate aperture in response to passing fluid over the first director plate aperture to the second director plate aperture.

The fluid injector and director plate provides for atomization of the fluid as will be more readily apparent from a thorough reading of the following description.

BRIEF DESCRIPTION OF DRAWINGS

This invention will be further described with reference to the accompanying drawings in which.

DETAILED DESCRIPTION OF INVENTION

Figure 1:
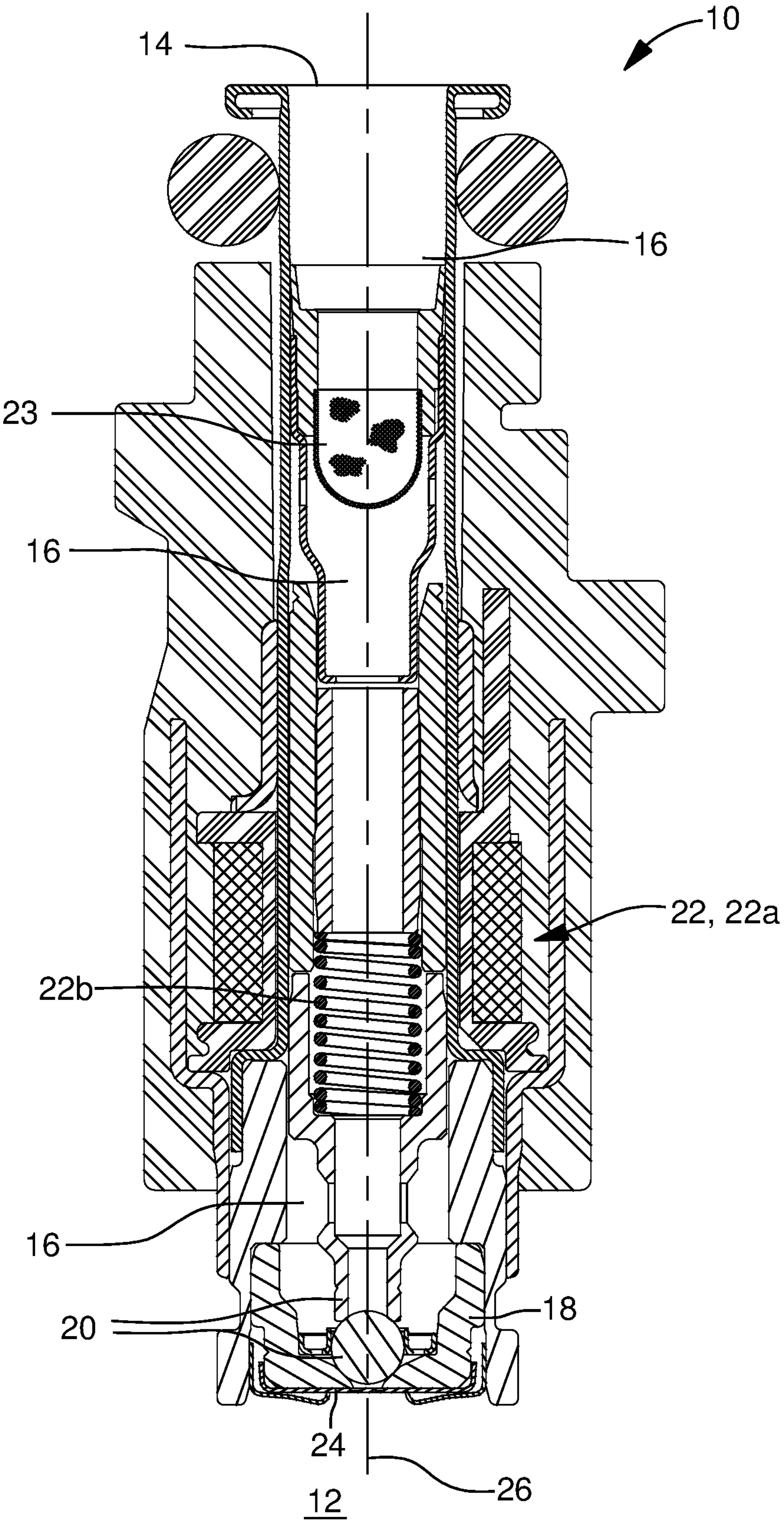
FIG. 1 is an axial cross-sectional view of a fluid injector in accordance with the present invention shown with a valve member in a closed position.
Figure 2:
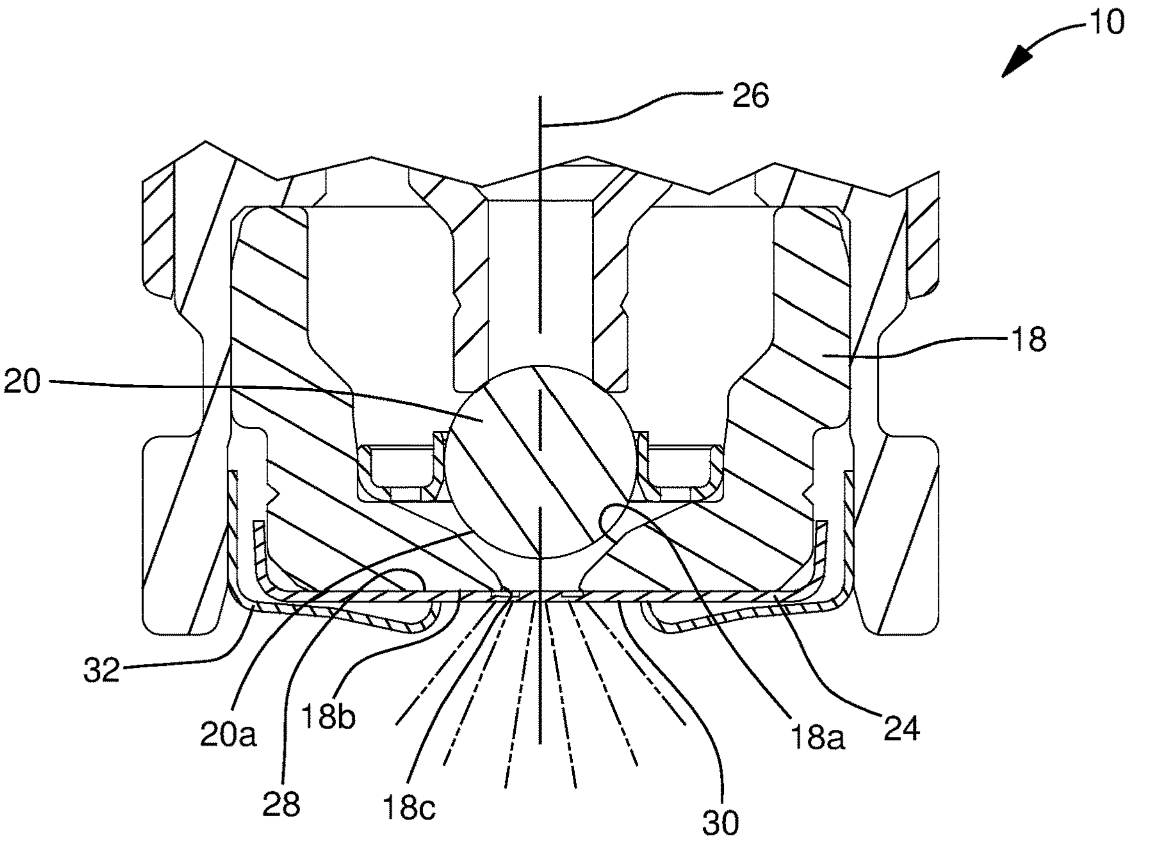
FIG. 2 is a portion of the axial cross-sectional view of the fluid injector of FIG. 1, now shown with the valve member in an open position.
Figure 3:
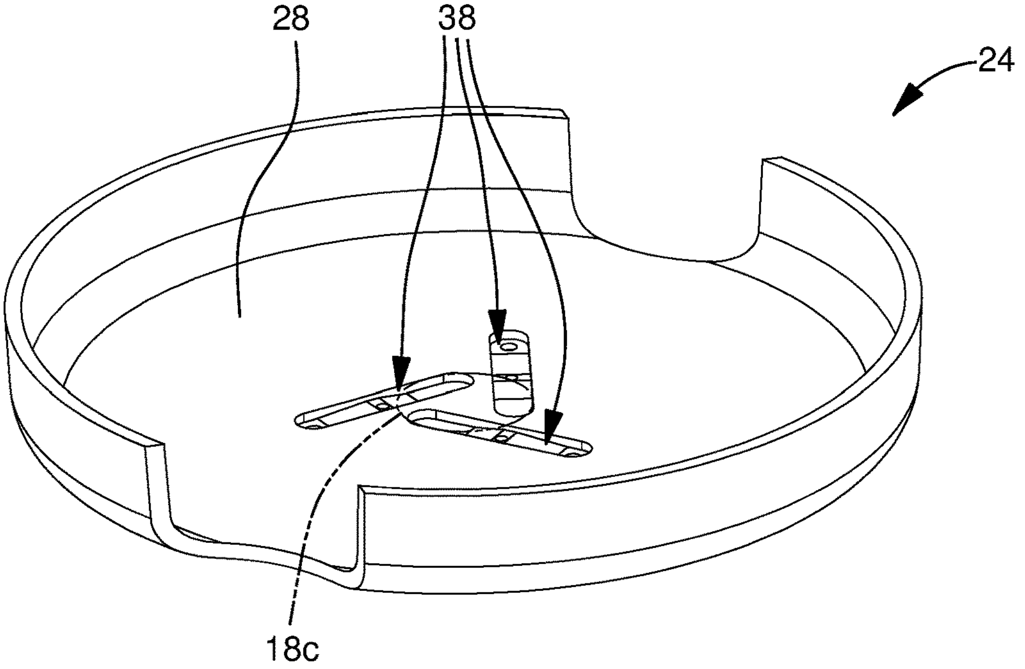
FIG. 3 is an isometric view of a director plate of the fluid injector of FIGS. 1 and 2.
Figure 4:
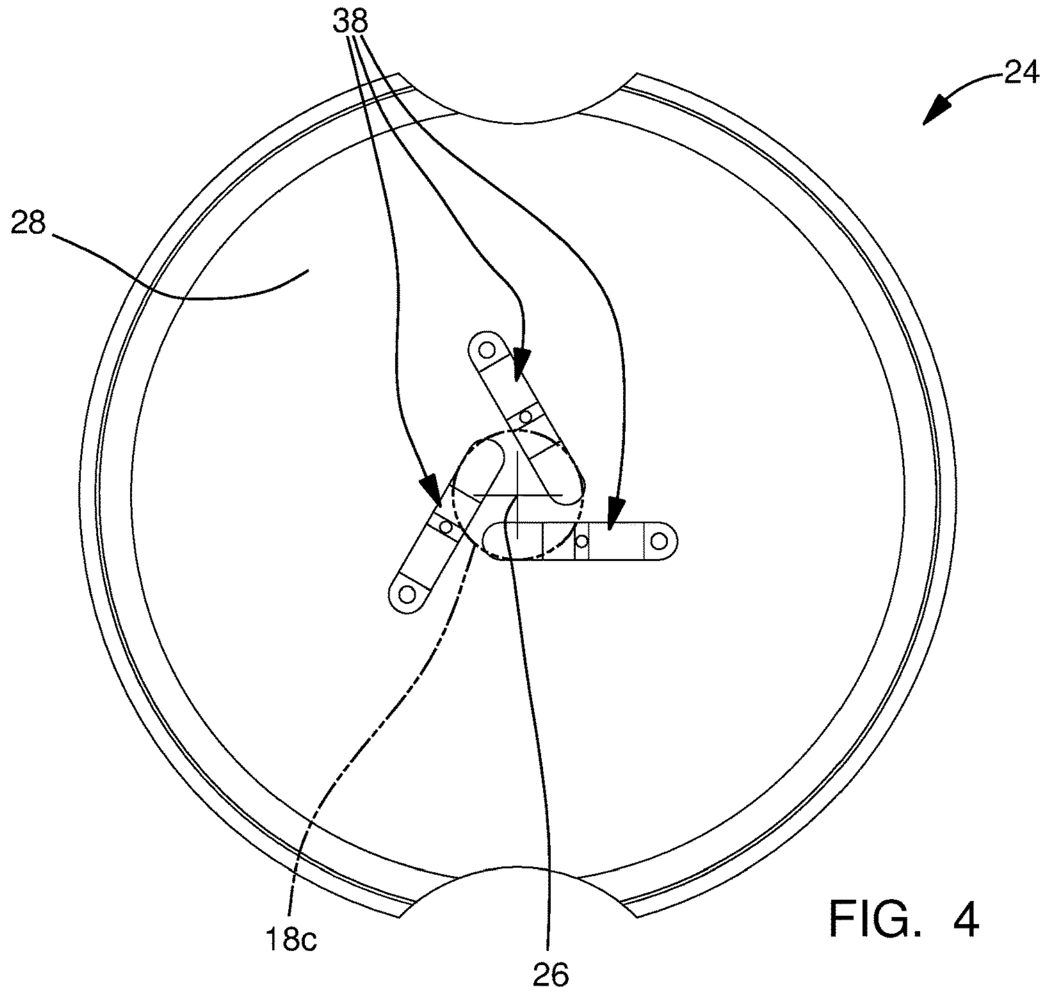
FIG. 4 is a top view of the director plate of FIG. 3.
Figure 5:
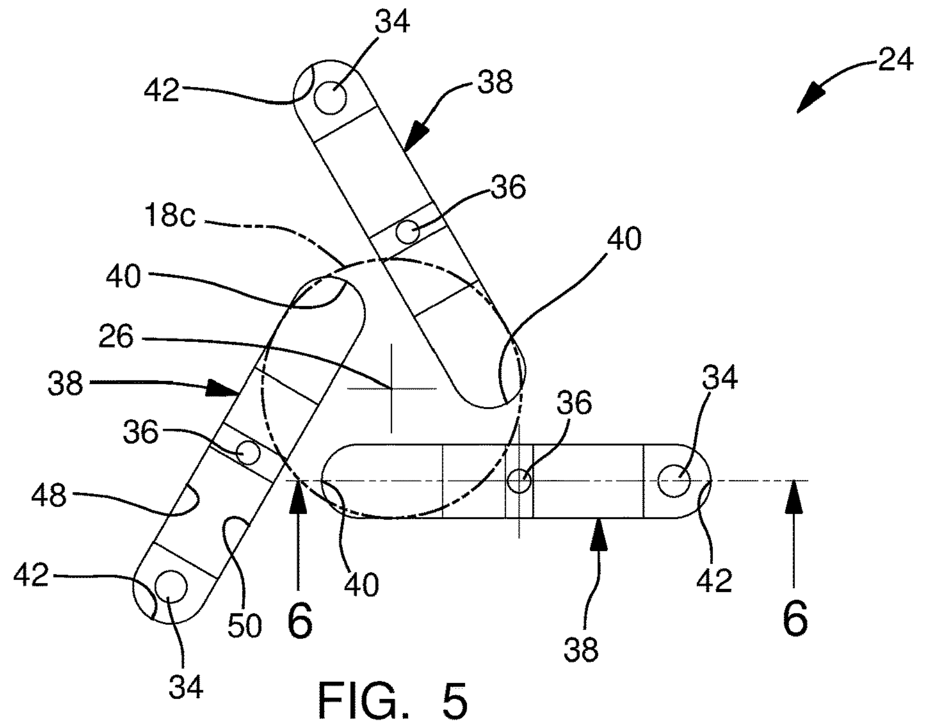
FIG. 5 is an enlarged view of a portion of FIG. 4.

Referring initially to FIGS. 1 and 2, a fluid injector 10 in accordance with the invention is illustrated, where fluid injector 10 is used to inject fluid into an atmosphere 12. While not imparting limitation, fluid injector 10 may be used to inject a reagent such as liquid urea, also known as diesel exhaust fluid (DEF), into an exhaust stream of an internal combustion engine (not shown) for use in a selective catalytic reduction (SCR) exhaust aftertreatment process or may alternatively be used to inject fuel, such as gasoline or diesel fuel, into an internal combustion engine. Fluid injector 10 generally includes a fluid inlet 14 which communicates fluid into fluid injector 10, a conduit 16 which receives fluid from fluid inlet 14 where conduit 16 may comprise several individual elements as shown, a valve seat 18 in conduit 16 and downstream of fluid inlet 14, a valve member 20 which is disposed within conduit 16 and which controls flow of fluid through fluid injector 10 by selectively seating and unseating with valve seat 18, an actuator 22 which imparts movement on valve member 20 to seat and unseat valve member 20 with valve seat 18, and a director plate 24 which shapes and atomizes fluid exiting fluid injector 10. A filter 23 may be provided in conduit 16 between fluid inlet 14 and valve seat 18 in order to prevent foreign matter that may be present in fluid entering fluid inlet 14 from reaching valve seat 18 and passing through fluid injector 10.

Valve seat 18 includes a valve seat upstream surface 18*a* proximal to fluid inlet 14 and a valve seat downstream surface 18*b* distal from fluid inlet 14. A valve seat aperture 18*c* extends through valve seat 18, thereby joining valve seat upstream surface 18*a* and valve seat downstream surface 18*b* such that valve seat aperture 18*c* is centered about, and extends through valve seat 18 along a fluid injector axis 26. As shown, valve seat upstream surface 18*a* may be a surface of revolution, and may include discrete sections that are each frustoconical and centered about fluid injector axis 26. Also as shown, valve seat downstream surface 18*b* may be planar and perpendicular to fluid injector axis 26. Valve member 20 includes a valve member surface 20*a* which is configured to provide sealing between valve member surface 20*a* and valve seat downstream surface 18*b* of valve seat 18 when valve member 20 is seated with valve seat 18. As shown, valve member surface 20*a* may be spherical. While an enabling embodiment of valve seat 18 and valve member 20 have been provided herein, it will be well understood to a person of ordinary skill in the art of fluid injectors that numerous other geometries may be provided which allow for positive sealing between valve seat 18 and valve member 20.

As illustrated herein actuator 22 may comprise a solenoid 22*a* and a return spring 22*b*. When actuator 22 is energized, a magnetic field is generated which attracts valve member 20, thereby moving valve member 20 upward as oriented in the figures to an open position as shown in FIG. 2 which unblocks and allows fluid communication through valve seat aperture 18*c*. Conversely, when actuator 22 is de-energized, the magnetic field ceases, thereby allowing return spring 22*b* to move valve member 20 downward as oriented the figures to a closed position as shown in FIG. 1 which blocks and prevents fluid communication through valve seat aperture 18*c*. In this way, valve member 20 is moveable between the closed position and the open position to precisely time when fluid is discharged from fluid injector 10. Solenoids, their individual elements, and their operation are well known to a person of ordinary skill in the art of fluid injection valves, and consequently, actuator 22 will not be described in greater detail herein. Furthermore, while actuator 22 has been illustrated as including solenoid 22*a* and return spring 22*b*, it will be well understood to a person of ordinary skill in the art of fluid injectors that other actuators may alternatively be used, and may be, by way of non-limiting example only, hydraulic actuators, piezoelectric actuators, and the like or combinations thereof.

As described above, seating and unseating of valve member 20 with valve seat 18 controls flow of fluid through valve seat aperture 18*c*. Consequently, valve member 20 and valve seat 18 are used to time when fluid is discharged from fluid injector 10. In order to control the shape of the fluid that is discharged from fluid injector 10 and to atomize the fluid that is discharged from fluid injector 10, director plate 24 is provided downstream of valve seat 18 which receives fluid from valve seat aperture 18*c* such that features are formed in one or both of valve seat 18 and director plate 24 which provide shaping and atomization as will be described in the paragraphs that follow.

Now with continued reference to FIGS. 1 and 2 and with particular reference additionally to FIGS. 3-6, director plate 24 includes a director plate upstream surface 28 that faces toward valve seat downstream surface 18*b* and also includes a director plate downstream surface 30 which is opposed to director plate upstream surface 28. Director plate upstream surface 28 is planar and is held in direct contact with valve seat downstream surface 18*b*, for example by a retention clip 32, but may be held in direct contact with valve seat downstream surface 18*b* by alternative means such as welding.

Director plate 24 includes one or more director plate outlet apertures 34 extending therethrough which allow fluid to exit at director plate downstream surface 30 and also includes one or more director plate inlet apertures 36 extending therethrough which allow aspiration of atmosphere 12 from director plate downstream surface 30. As shown, director plate 24 may include three of each of director plate outlet apertures 34 and director plate inlet apertures 36, however, it should be understood that a lesser quantity or a greater quantity of each may be provided.

One or more fluid flow channels 38 are formed between valve seat 18 and director plate 24. As shown, one fluid flow channel 38 is provided for each respective pair of director plate outlet aperture 34 and director plate inlet aperture 36 such that director plate outlet aperture 34 and director plate inlet aperture 36 extend from fluid flow channel 38 to director plate downstream surface 30. Each fluid flow channel 38 may be substantially the same, and consequently, the subsequent description will be made to one fluid flow channel 38 with the understanding that the description is equally applicable to each fluid flow channel 38. Fluid flow channel 38 extends from an inlet end 40 to an outlet end 42 in a plane that is perpendicular to fluid injector axis 26 such that inlet end 40 is open to, and proximal to valve seat aperture 18*c*. Director plate inlet aperture 36 is located between inlet end 40 and director plate outlet aperture 34, consequently, fluid flows from inlet end 40, past director plate inlet aperture 36 toward outlet end 42, before exiting fluid flow channel 38 through director plate outlet aperture 34. As may be best shown in FIGS. 3, 4, and 5 where valve seat aperture 18*c* is shown as a phantom line superimposed on director plate 24, inlet end 40 may be axially aligned with valve seat aperture 18*c*, and consequently fluid exiting valve seat aperture 18*c* must enter fluid flow channel 38 upstream of director plate inlet aperture 36. Furthermore with regard to FIGS. 3, 4, and 5, it is important to understand that with the exception of the areas inside valve seat aperture 18*c* which overlap with fluid flow channels 38, valve seat downstream surface 18*b* is in direct contact with director plate upstream surface 28, thereby preventing fluid flow across the interface of valve seat downstream surface 18*b* and director plate upstream surface 28.

In order to allow atmosphere 12 to be aspirated through director plate inlet aperture 36, fluid flow channel 38 decreases in cross-sectional area in a direction from inlet end 40 toward director plate inlet aperture 36 and increase in cross-sectional area in a direction from director plate inlet aperture 36 toward director plate outlet aperture 34. The initial decrease in cross-sectional area prior to reaching director plate inlet aperture 36 followed by the increase in cross-sectional area after director plate inlet aperture 36 produces a venturi effect which aspirates atmosphere 12 into fluid flow channel 38 which increases atomization of fluid that is discharged through director plate outlet aperture 34. As shown, the decrease in cross-sectional area in the direction from inlet end 40 toward director plate inlet aperture 36 and the increase in cross-sectional in the direction from director plate inlet aperture 36 toward director plate outlet aperture 34 is accomplished by varying a distance, in a direction parallel to fluid injector axis 26, between an upper wall 44 of fluid flow channel 38, which is formed by valve seat 18, and a lower wall 46 of fluid flow channel 38, which is formed by director plate 24, and which is opposed to upper wall 44. As a result, the distance between upper wall 44 and lower wall 46 decreases in the direction from inlet end 40 toward director plate inlet aperture 36 as shown by distance D1 and distance D2 in FIG. 6 and the distance between upper wall 44 and lower wall 46 increase in the direction from director plate inlet aperture 36 toward director plate outlet aperture 34 as shown by distance D2 and distance D3 in FIG. 6 where distance D1 may be equal to distance D3, however, distance D1 and distance D3 may alternatively be unequal. Preferably, distance D2 is a fraction of 0.75, or less, of D1, i.e. D2 is less than or equal to 0.75 times D1. Consequently, the resulting cross-sectional area at D2 is less than or equal to 0.75 times the cross-sectional area at D1. As shown, upper wall 44 may be formed by valve seat downstream surface 18*b*, and consequently, upper wall 44 is planar for its entire length from the end of upper wall 44 that is proximal to inlet end 40 to outlet end 42. Fluid flow channel 38 is further defined by a first sidewall 48 which extends from upper wall 44 to lower wall 46 and a second sidewall 50 which extends from upper wall 44 to lower wall 46 such that second sidewall 50 is opposed to first sidewall 48. As shown, fluid flow channel 38 may extend into director plate 24 from director plate upstream surface 28, and consequently, first sidewall 48 and second sidewall 50 are formed by director plate 24. In addition to, or in the alternative, fluid flow channel 38 may extend into valve seat 18 from valve seat downstream surface 18*b*.

Figure 6:
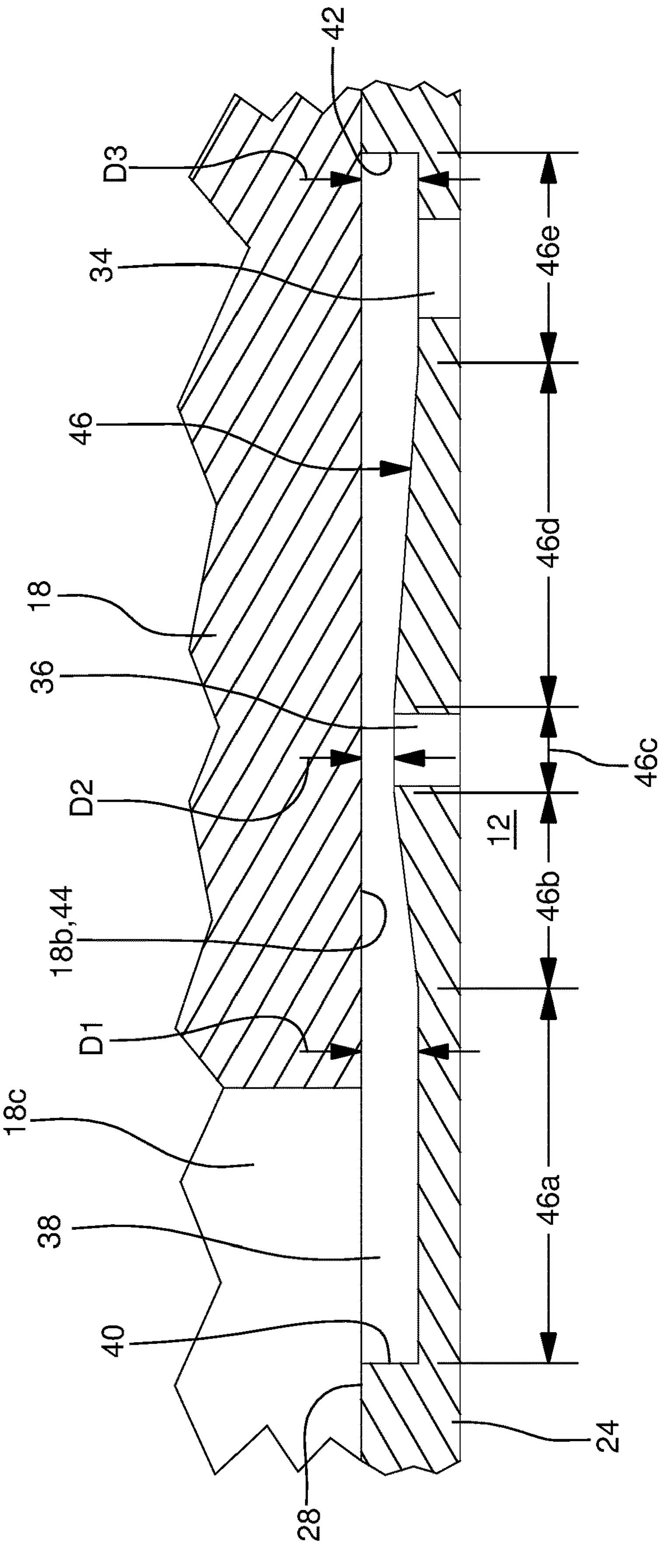
FIG. 6 is a cross-sectional view of a fluid flow channel of the director plate of FIG. 4 taken through section line 6-6 of FIG. 4.

Lower wall 46 will now be described in greater detail with particular emphasis on FIG. 6 where lower wall 46 includes five distinction portions; a first portion 46*a*, a second portion 46*b*, a third portion 46*c*, a fourth portion 46*d*, and a fifth portion 46*e*. First portion 46*a* initiates at inlet end 40 and terminates at second portion 46*b* where first portion 46*a* is planar and parallel to director plate upstream surface 28 and valve seat downstream surface 18*b*, i.e. upper wall 44. Second portion 46*b* initiates at first portion 46*a* and terminates at third portion 46*c* where second portion 46*b* is inclined upward toward upper wall 44 when moving from first portion 46*a* toward third portion 46*c*. As shown, second portion 46*b* may have a constant slope, thereby making second portion 46*b* planar, however, second portion 46*b* may alternatively have a slope that is not constant. Third portion 46*c* initiates at second portion 46*b* and terminates at fourth portion 46*d* where third portion 46*c* is planar and parallel to director plate upstream surface 28 and valve seat downstream surface 18*b*, i.e. upper wall 44. Furthermore, director plate inlet aperture 36 extends from third portion 46*c* to director plate downstream surface 30. Fourth portion 46*d* initiates at third portion 46*c* and terminates at fifth portion 46*e* where fourth portion 46*d* is inclined downward away from upper wall 44 when moving from third portion 46*c* toward fifth portion 46*e*. As shown, fourth portion 46*d* may have a constant slope, thereby making fourth portion 46*d* planar, however, fourth portion 46*d* may alternatively have a slope that is not constant. Furthermore, fourth portion 46*d* has a slope that is more gradual than second portion 46*b*, i.e. fourth portion 46*d* covers a length in a direction from inlet end 40 toward outlet end 42 that is greater than second portion 46*b*, and fourth portion 46*d* may cover a length that is at least 1.5 times that of second portion 46*b*. In other words, the absolute value of the slope of second portion 46*b* is at least 1.5 times that of the absolute value of fourth portion 46*d*. Fifth portion 46*e* initiates at fourth portion 46*d* and terminates at outlet end 42 where fifth portion 46*e* is planar and parallel to director plate upstream surface 28 and valve seat downstream surface 18*b*, i.e. upper wall 44. Furthermore, director plate outlet aperture 34 extends from fifth portion 46*e* to director plate downstream surface 30.

The difference in cross-sectional area of each of director plate outlet aperture 34 and director plate inlet aperture 36 must also be taken into consideration for producing the venturi effect which causes aspiration of atmosphere 12 into fluid flow channel 38 through director plate inlet aperture 36. In order to function properly, the cross-sectional area of director plate inlet aperture 36 must be less that the cross-sectional area of director plate outlet aperture 34. More specifically, the cross-sectional area of director plate inlet aperture 36 may be 0.75 times or less than that of the cross-sectional area of director plate outlet aperture 34. As used herein, the cross-sectional area of director plate outlet aperture 34 and director plate inlet aperture 36 is the cross-sectional area produced by a cutting plane that is perpendicular to an axis about which director plate outlet aperture 34 or director plate inlet aperture 36 is centered about and extends along through director plate 24. If one or more of director plate outlet aperture 34 and director plate inlet aperture 36 is stepped or tapered from fluid flow channel 38 to director plate downstream surface 30, the cross-sectional area is the portion which has the smallest cross-sectional area.

While the cross-sectional area of fluid flow channel 38 has been shown as being varied by varying the distance between upper wall 44 and lower wall 46, it should now be understood that the cross-sectional area of fluid flow channel 38 may alternatively be varied by varying the width of fluid flow channel 38, i.e. the distance between first sidewall 48 and second sidewall 50.

Figure 7:
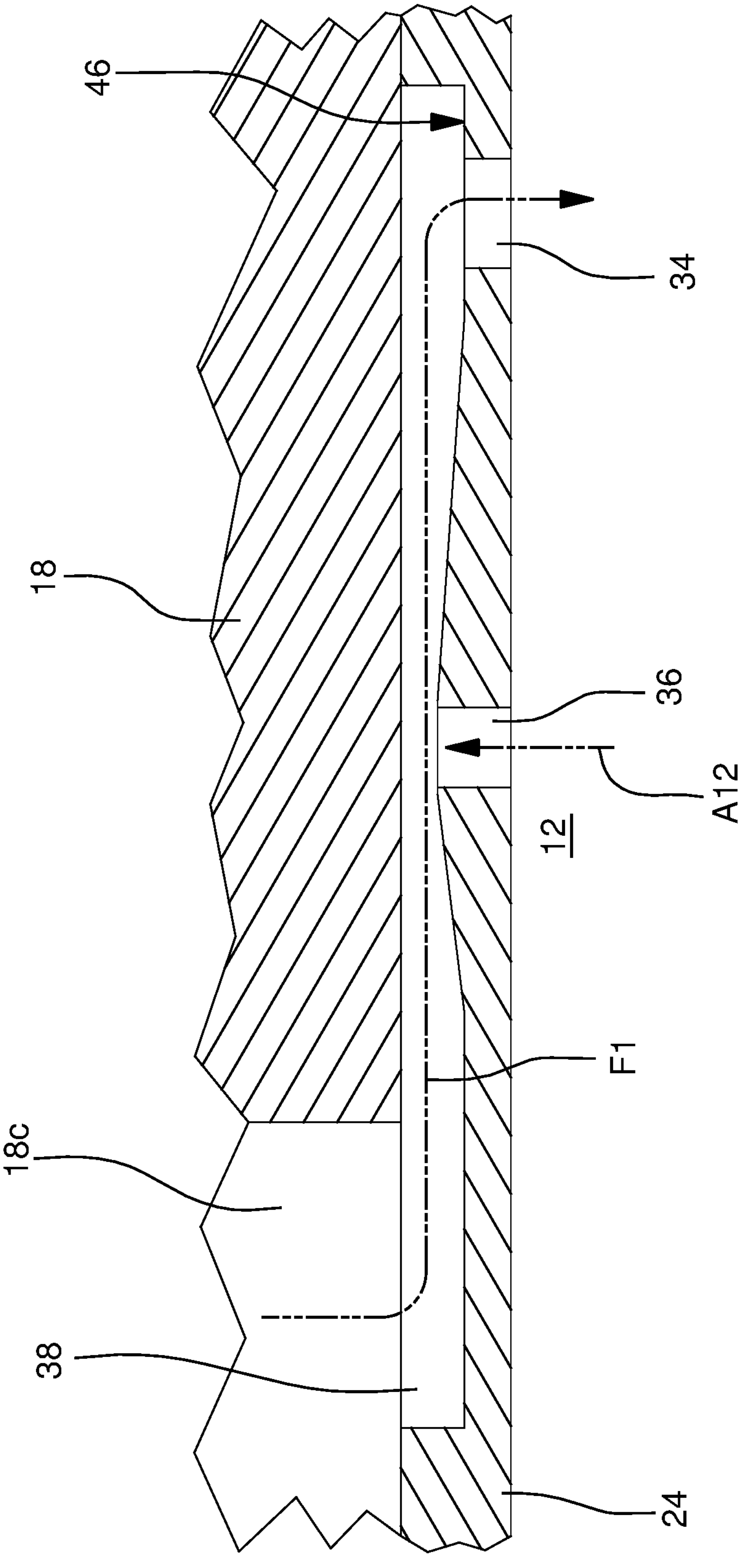
FIG. 7 is the cross-sectional view of FIG. 6, now including flow arrows to show flow.

In operation, when valve member 20 is unseated from valve seat 18 as shown in FIG. 2, fluid passes through valve seat aperture 18*c* and enters fluid flow channels 38. As shown in FIG. 7, fluid flow, represented by arrow μl, travels through fluid flow channel 38 over director plate inlet aperture 36 with increased velocity, thereby aspirating atmosphere 12 into fluid flow channel 38 through director plate inlet aperture 36 as represented by arrow A12 due to the venturi effect. The aspiration of atmosphere 12 into fluid flow channel 38 results in a finely atomized spray of fluid from director plate outlet aperture 34.

While this invention has been described in terms of preferred embodiments thereof, it is not intended to be so limited, but rather only to the extent set forth in the claims that follow.

We claim:

1. A fluid injector for injecting fluid into an atmosphere, said fluid injector comprising:

- a fluid inlet which communicates fluid into said fluid injector;
- a valve seat downstream of said fluid inlet, said valve seat having a valve seat aperture extending therethrough;
- a valve member which is moveable between 1) a closed position which blocks said valve seat aperture, thereby preventing fluid communication through said valve seat aperture and 2) an open position which unblocks said valve seat aperture, thereby allowing fluid communication through said valve seat aperture;
- a director plate located downstream of said valve seat, said director plate having a first director plate aperture extending therethrough which aspirates from said atmosphere and a second director plate aperture extending therethrough which discharges fluid from said fluid injector to said atmosphere; and a fluid flow channel which includes an upper wall formed by said valve seat and also includes a lower wall which is opposed to said upper wall and which is formed by said director plate, said fluid flow channel being formed between said valve seat and said director plate and extending from an inlet end to an outlet end such that said first director plate aperture and said second director plate aperture extend through said director plate from said fluid flow channel and such that said first director plate aperture is located between said inlet end and said second director plate aperture, wherein said inlet end is open to, and proximal to, said valve seat aperture, wherein said fluid flow channel decreases in cross-sectional area in a direction from said inlet end toward said first director plate aperture, and wherein said fluid flow channel increases in cross-sectional area in a direction from said first director plate aperture toward said second director plate aperture.

2. A fluid injector as in claim 1, wherein said first director plate aperture is smaller in cross-sectional area than said second director plate aperture.

3. A fluid injector as in claim 1, wherein:

said first director plate aperture is one of a plurality of first director plate apertures extending therethrough which aspirate from said atmosphere;

said second director plate aperture is one of a plurality of second director plate apertures extending therethrough which discharge fluid from said fluid injector to said atmosphere;

said fluid flow channel is one of a plurality of fluid flow channels formed between said valve seat and said director plate such that each of the plurality of fluid flow channels extends from a respective inlet end to a respective outlet end;

each of said plurality of fluid flow channels includes a respective one of said plurality of first director plate apertures extending therefrom through said director plate and also includes a respective one of said plurality of second director plate apertures extending therefrom through said director plate such that said respective one of said plurality of first director plate apertures is located between said respective inlet end and said respective one of said plurality of second director plate apertures wherein said respective inlet end of each of said plurality of fluid flow channels is open to, and proximal to, said valve seat aperture, wherein each of said plurality of fluid flow channels decreases in cross-sectional area in a direction from said respective inlet end toward said respective one of said plurality of first director plate apertures, and wherein each of said plurality of fluid flow channels increases in cross-sectional area in a direction from said respective one of said plurality of first director plate apertures toward said respective one of said plurality of second director plate apertures.

4. A fluid injector for injecting fluid into an atmosphere, said fluid injector comprising:

a fluid inlet which communicates fluid into said fluid injector;

a valve seat downstream of said fluid inlet, said valve seat having a valve seat aperture extending therethrough;

a valve member which is moveable between 1) a closed position which blocks said valve seat aperture, thereby preventing fluid communication through said valve seat aperture and 2) an open position which unblocks said valve seat aperture, thereby allowing fluid communication through said valve seat aperture;

a director plate located downstream of said valve seat, said director plate having a first director plate aperture extending therethrough which aspirates from said atmosphere and a second director plate aperture extending therethrough which discharges fluid from said fluid injector to said atmosphere; and a fluid flow channel formed between said valve seat and said director plate and extending from an inlet end to an outlet end such that said first director plate aperture and said second director plate aperture extend through said director plate from said fluid flow channel and such that said first director plate aperture is located between said inlet end and said second director plate aperture, wherein said inlet end is open to, and proximal to, said valve seat aperture, wherein said fluid flow channel decreases in cross-sectional area in a direction from said inlet end toward said first director plate aperture, and wherein said fluid flow channel increases in cross-sectional area in a direction from said first director plate aperture toward said second director plate aperture;

wherein said fluid flow channel includes an upper wall formed by said valve seat and also includes a lower wall which is opposed to said upper wall and which is formed by said director plate; and wherein a distance between said upper wall and said lower wall decreases in said direction from said inlet end toward said first director plate aperture and increases in said direction from said first director plate aperture toward said second director plate aperture.

5. A fluid injector as in claim 4, wherein:

said fluid flow channel includes a first sidewall which extends from said upper wall to said lower wall and also includes a second sidewall which is opposed to said first sidewall and extends from said upper wall to said lower wall; and said first sidewall and said second sidewall are each formed by said director plate.

6. A fluid injector as in claim 5, wherein:

said valve seat aperture is centered about, and extends through said valve seat, along an axis; and said inlet end of said fluid flow channel is axially aligned with said valve seat aperture.

7. A fluid injector as in claim 5, wherein:

said valve seat aperture is centered about, and extends through said valve seat, along an axis; and a portion of said fluid flow channel between said inlet end and said first director plate aperture is axially aligned with said valve seat aperture.

8. A fluid injector as in claim 4, wherein said upper wall is planar from proximal to said inlet end to said outlet end.

9. A fluid injector as in claim 4, wherein said lower wall of said fluid flow channel comprises a first portion, a second portion, a third portion, a fourth portion, and a fifth portion, wherein:

said first portion initiates at said inlet end and terminates at said second portion, said first portion being planar and parallel to said upper wall;

said second portion initiates at said first portion and terminates at said third portion, said second portion being inclined toward said upper wall in a direction from said first portion to said third portion;

said third portion initiates at said second portion and terminates at said fourth portion, said third portion being planar and parallel to said upper wall;

said fourth portion initiates at said third portion and terminates at said fifth portion, said fourth portion being inclined away from said upper wall in a direction from said third portion to said fifth portion; and said fifth portion initiates at said fourth portion and terminates at said outlet end, said fifth portion being planar and parallel to said upper wall.

10. A fluid injector as in claim 9, wherein:

said first director plate aperture extends from said third portion; and said second director plate aperture extends from said fifth portion.

11. A fluid injector as in claim 9, wherein:

said second portion has a second portion slope;

said fourth portion has a fourth portion slope; and an absolute value of said second portion slope is greater than an absolute value of said fourth portion slope.

12. A fluid injector as in claim 11, where said absolute value of said second portion slope is at least 1.5 times greater than said absolute value of said fourth portion slope.

13. A fluid injector as in claim 11, wherein:

said second portion is planar; and said fourth portion is planar.

14. A method for operating a fluid injector for injecting fluid into an atmosphere, said fluid injector comprising a fluid inlet which communicates fluid into said fluid injector; a valve seat downstream of said fluid inlet, said valve seat having a valve seat aperture extending therethrough; a valve member which is moveable between 1) a closed position which blocks said valve seat aperture, thereby preventing fluid communication through said valve seat aperture and 2) an open position which unblocks said valve seat aperture, thereby allowing fluid communication through said valve seat aperture; a director plate located downstream of said valve seat, said director plate having a first director plate aperture extending therethrough which aspirates from said atmosphere and a second director plate aperture extending therethrough which discharges fluid from said fluid injector to said atmosphere; and a fluid flow channel which includes an upper wall formed by said valve seat and also includes a lower wall which is opposed to said upper wall and which is formed by said director plate, said fluid flow channel being formed between said valve seat and said director plate and extending from an inlet end to an outlet end such that said first director plate aperture and said second director plate aperture extend through said director plate from said fluid flow channel and such that said first director plate aperture is located between said inlet end and said second director plate aperture, wherein said inlet end is open to, and proximal to, said valve seat aperture, wherein said fluid flow channel decreases in cross-sectional area in a direction from said inlet end toward said first director plate aperture, and wherein said fluid flow channel increases in cross-sectional area in a direction from said first director plate aperture toward said second director plate aperture; said method comprising:

moving said valve member to said open position;

passing fluid through said valve seat aperture to said fluid flow channel in response to moving said valve member to said open position;

passing fluid over said first director plate aperture to said second director plate aperture and then to said atmosphere; and aspirating said atmosphere into said fluid flow channel through said first director plate aperture in response to passing fluid over said first director plate aperture to said second director plate aperture.

* * * * *